US009168961B2

(12) United States Patent
Braun (10) Patent No.: US 9,168,961 B2
(45) Date of Patent: Oct. 27, 2015

(54) TRACKLAYING GEAR (75) Inventor: Arthur Braun, Deidesheim (DE)

(73) Assignee: JOSEPH VOGELE AG, Ludwigshafen/Rhein (DE)

( * ) Notice: Subject to any disclaimer, the term of this patent is extended or adjusted under 35 U.S.C. 154(b) by 644 days.

(21) Appl. No.: 13/547,493

(22) Filed: Jul. 12, 2012

(65) Prior Publication Data

US 2013/0020860 A1 Jan. 24, 2013

(30) Foreign Application Priority Data

Jul. 18, 2011 (EP) ..................................... 11005873

(51) Int. Cl.
*B62D 55/12* (2006.01)
*B62D 55/096* (2006.01)

(52) U.S. Cl.
CPC ........ B62D 55/0963 (2013.01); B62D 55/0966 (2013.01)

(58) Field of Classification Search
CPC ............. B62D 55/096; B62D 55/0963; B62D 55/0966; B62D 55/12; B62D 55/14; B62D 55/145
USPC .......... 305/136, 137, 194, 195, 196, 197, 199
See application file for complete search history.

(56) References Cited

U.S. PATENT DOCUMENTS

| | | | | |
|---|---|---|---|---|
| 1,885,485 | A | * | 11/1932 | Smyth .......................... 180/9.54 |
| 3,730,013 | A | | 5/1973 | Slemmons |
| 4,083,247 | A | * | 4/1978 | Umezaki et al. .............. 474/151 |
| 6,631,961 | B1 | | 10/2003 | Bedford et al. |
| 6,739,678 | B2 | * | 5/2004 | Moebs et al. ................. 305/136 |
| 7,370,865 | B2 | * | 5/2008 | Vik et al. ....................... 277/380 |
| 2010/0141026 | A1 | | 6/2010 | Angot et al. |

FOREIGN PATENT DOCUMENTS

| | | |
|---|---|---|
| JP | S49-005820 U | 4/1972 |
| JP | 56-138068 A | 10/1981 |
| JP | S55-107490 U | 1/1989 |
| JP | S58-029581 U | 8/1991 |
| WO | 03/018388 A1 | 3/2003 |

OTHER PUBLICATIONS

EPO Official Action dated Oct. 14, 2013 for corresponding EP Application No. 11 005 873.2-1757 (German language with English language translation of summary of the action.
JPO Official Action dated Sep. 3, 2013 for corresponding JP Application No. 2012-159761 (English translation).
JPO Official Action dated Sep. 3, 2013 which issued in corresponding JP Application No. 2012-159761 (English translation).
European Search Report mailed Nov. 17, 2011, which issued in corresponding EP Application No. 11005873. 3 pages.

* cited by examiner

*Primary Examiner* — S. Joseph Morano
*Assistant Examiner* — Jean Charleston
(74) *Attorney, Agent, or Firm* — Fish & Richardson P.C.

(57) ABSTRACT

In a tracklaying gear of a road finishing machine or a feeder with a drive chain wheel comprising circumferential teeth and being rotatably driven about an axis, and at least one idler wheel freely rotating about an axis inside a caterpillar track damping layers having damping material and exclusively radial sliding guides are integrated in the drive chain wheel and/or the idler wheel between the axis and the caterpillar track.

11 Claims, 6 Drawing Sheets

TRACKLAYING GEAR

FIELD OF THE INVENTION

The invention relates to a tracklaying gear of a road finishing machine or a feeder with a drive chain wheel having circumferential teeth and wherein the wheel is rotatably driven about an axis.

BACKGROUND OF THE INVENTION

The idler wheel of a generic tracklaying gear disclosed in WO 03/018388 A comprises an outer part with a U-shaped cross-section consisting of individual segments, and an inner part mounted to be rotatable about the axis which engages, with a thickened outer rim, the U-groove of the outer part from the inside. Each segment is movably fixed in the thickened rim via two axial pins. On both sides of a centric surrounding collar at the outer side of the rim, elastomer rings of an approximately rectangular cross-section are inserted with pre-tension and relatively movably support the outer part on the inner part with a radial as well as an axial clearance on both sides. Due to the pre-tension of the elastic rings, these have load-transmitting abilities in the axial as well as in the radial direction. There is no direct, exclusively radial sliding guide between the inner and the outer parts. The transverse pins fixing the segments form a drive type fastening between the outer and the inner parts with a form-fit in the circumferential direction.

In the idler wheel or the drive chain wheel of the generic tracklaying gear disclosed in U.S. Pat. No. 3,730,013 A, the respective outer annular part is connected with the inner, hub-like part only via pretensioned elastomer rings inserted between them. In the inner part, at an axial side, a pendulum balancing system with rolling elements distributed in the circumferential direction and with a ring radially movable relative to the inner part by the rolling elements is provided. In addition to the damping rings between the outer and the inner parts, on the outer parts, additional external elastomer rings are inserted in positioning grooves.

In the idler wheel of a tracklaying gear of US 2010/0141026 A, at the circumferential flange of the inner part, ring bodies are externally fixed on both sides by means of straining screws which project with broadened shoulder parts to the outside beyond the outer periphery of the peripheral flange and receive a base part of an outer ring with a T-shaped cross-section between them such that the inner diameter of the base part has a radial clearance to the outer diameter of the peripheral flange. In positioning grooves of the two ring bodies opened to the outside, elastomer rings are inserted on both sides of the base part which are pre-tensioned such that they obtain load-transmitting abilities and transmit radial as well as axial loads. The inner walls of the ring bodies are tensioned against the outer walls of the peripheral flange of the inner part, while the outer walls of the base part of the outer ring each maintain an axial clearance to the inner walls of the ring parts, so that the outer ring is centered by the pre-tensioned elastomer rings radially and axially with respect to the inner part. The degree of the axial clearance can be between 0.5 to 2.0 mm per side, so that the outer ring can have an axial moving part with respect to the inner part of up to 4.0 mm and thus no exclusively relative sliding guide is given.

In an idler wheel disclosed in JP 56138068 A, two outer parts are circumferentially mounted on the periphery of the inner metallic part such that they define a circumferential groove between them which is open to the outside. In the circumferential groove, a pressurized elastomer hose is provided between the inner walls of the outer parts and the outer periphery of the inner part, the hose acting upon an annular member radially to the outside and against a joint sleeve of a track joint, the annular member being of a material worn by friction which is different from the metal material of the inner and outer parts. The annular member has an H-section and can enlarge or reduce its radius in adaptation to an expansion or contraction of the pressure hose.

In a tracklaying gear of U.S. Pat. No. 5,758,932 A, instead of standardized circumferential teeth, a profiling is attached at the outer periphery of the drive chain wheel which is designed similar to the tread of a wet tire and which has diamond-shaped elevations to engage with the caterpillar track and channels situated in-between to discharge penetrated impurities. This circumferential teeth structure is either formed of the metal material of the drive chain wheel, or it is attached by welding or casting and thus consists of a metallic material. Also due to the polygon effect in the driving operation of the tracklaying gear, the caterpillar track or the links of the caterpillar track cyclically hit the drive chain wheel which generates loud noise and undesired wear.

In a tracklaying gear of a road finishing machine disclosed in EP 2 050 664 A, a solid rubber jacket is vulcanized onto the circumference of the metallic idler wheel, via which the idler wheel is in contact with the caterpillar track. The solid rubber jacket must take on the total load and transmit it to the metallic part of the idler wheel which can result in strong wear and a floating driving feel.

In a tracklaying gear disclosed in US 2007/0029878 A, the idler wheel and the drive chain wheel are completely fabricated of metal, and the load is transmitted into the running gear suspension via metallic contact surfaces, so that the inevitable impacts of the caterpillar track lead to the generation of loud noise.

In the tracklaying gear shown in U.S. Pat. No. 3,647,270 A, the drive chain wheel (tumbler) and the idler wheel are metallic, resulting in loud running noise.

EP 0 721 879 B1 discloses two external, axially separated rubber linings in an idler wheel.

US 2002/0113489 A discloses ring segments at the circumference of a running wheel of a tracklaying gear which are coupled to the hub part via transverse pins contained in rubber sleeves. The rubber sleeves are placed in saucer-type recesses in the ring segments in the circumference of the hub part. The ring segments are movably coupled to one another via transverse pins. A radial guidance of the outer lining of this running wheel is not possible.

DE 3 537 665 A relates to a multi-part idler or running wheel for tracklaying gears wherein between the inner and outer parts of the running wheel, two annular damping layers are inserted and a raised guide collar is provided in the center, and bearing shoulders are provided on both sides. There is no clear radial guidance.

DE 2 617 342 A discloses a tumbler in which between two outer crown gears which are rigidly connected to the hub, two rubber linings are externally attached on the hub on which the caterpillar track can support itself and between which a guiding indentation for the lateral guidance of the caterpillar track is kept clear.

The object underlying the present invention is to provide a tracklaying gear of the type mentioned above which is characterized by low operating noises in the driving operation with a stable guidance of the caterpillar track.

SUMMARY OF THE INVENTION

The set object is achieved with the features of the present invention in which the drive chain wheel and/or the idler wheel is, between the axle and the caterpillar track, divided into inner and outer annular parts which are guided relatively to the axle and are exclusively movably radially relative to one another and so as to slide against each other. The at least two damping layers are arranged internally between the parts. Here, the damping layers take on loads exerted by the caterpillar track on the metallic parts of the drive chain wheel or the idler wheel, without, however, coming into direct contact with the caterpillar track. In this manner, an effective inner damping is achieved by consuming the energy from the essentially radially acting impacts in the damping layer with radial relative motions between the parts. Since the parts are guided to exclusively slide radially relative to one another, no impacts are transmitted via the sliding guide, but lateral guiding forces are built up. Impacts inevitably exerted by the caterpillar track in the driving operation are thus dampened by the integrated damping layers, whereby above all operating noise and also wear are reduced. However, the integration of the damping layers should be designed such that there is nevertheless a metallic contact also at least between the drive chain wheel and the caterpillar track in order not to overload the damping layers or to wear them down prematurely, and mainly to transmit lateral guiding forces. Despite the damping layers minimizing the operating noise, with the invention, shearing forces in the damping layers are avoided by the exclusively radial sliding guide, which will increase service life and ensure a stable, directed running of the caterpillar track over the wheels.

In one suitable embodiment, in the idler wheel and/or optionally in the drive chain wheel, in addition two annular damping layers with approximately identical diameters are provided axially outside and separated by a space in the axial direction, and in the region of the space, the metallic external teeth of the drive chain wheel or the guide collar of the idler wheel are arranged, so that here, mainly load transmission takes place, while the additional damping layers dampen abrupt energy peaks from impacts generated by the caterpillar track without being overloaded in the process, because the inner damping layers are also effective. The respective additional damping layer is attached outside on the respective bearing shoulder e.g. at the idler wheel, and firmly connected to it, preferably by drawing up, oversize shrink fitting, spraying, gluing or vulcanizing. While the raised guide collar transmits at least lateral guiding forces optionally in direct contact with the caterpillar track, impacts of the caterpillar track are also dampened by the additional damping layers which do not have to transmit the total load of the caterpillar track as would be the case with a solid rubber jacket of the idler wheel. This solution can lead to a very silent operating noise especially with the idler wheel.

The damping material of the damping layer is suitably reinforced or non-reinforced elastomer, e. g. polyurethane rubber, e.g. with a Shore A hardness between about 80 and about 92, and/or rubber, such as hard rubber.

In a suitable embodiment, the outer part of the drive chain wheel comprising the circumferential teeth and embodied as single-part ring disk or as ring disk assembled from segments with an internal circumferential base part and at least one first radial guiding structure, the inner part, which is preferably separable for assembly, is embodied with a circumferential crown matching the base part with at least one second radial guiding structure matching the first radial guiding structure, cylindrical or conical support surfaces facing each other are provided at the base part and at the crown, the respective damping layer is arranged between the support surfaces, optionally firmly connected to a support surface, and the first and the second radial guiding structures engage each other with a radial free motion. This embodiment of the drive chain wheel is structurally simple and fail-safe with the radial sliding guide.

In another embodiment, the outer part of the idler wheel comprising the guide collar and bearing shoulders on both sides is embodied as supporting ring with at least one internal first radial guiding structure and cylindrical or conical support surfaces on either side of the first radial guiding structure, the inner part rotatably mounted on the axle is embodied as annular hub with at least one second radial guiding structure matching the first radial guiding structure and with cylindrical or conical support surfaces on either side of the second radial guiding structure in a circumferential crown matching the supporting ring, one damping layer each is arranged between the inner and the outer support surfaces, preferably firmly connected to a support surface, and the first and the second radial guiding structures engage each other exclusively with a radial free motion. Nearly all loads of the caterpillar track, except for the lateral guiding forces transmitted via the guide, are transmitted via the damping layers, so that they dampen efficiently, optionally supported by external additional damping layers on either side of the guide collar. For a uniform power transmission, the sliding guide is suitably arranged axially centrically with pairs of guiding surfaces.

Suitably, the crown is axially wider than the base part or the supporting ring, annular flanges radially projecting to the outside are provided at the edges of the crown which secure the base part or the supporting ring, respectively, in the axial direction without metallic contact because their protrusion is preferably smaller than the radial thickness of the damping layer. This also increases the lateral stiffness of the damping layers.

In a particularly advantageous embodiment, a drive type fastening with a form-fit in the circumferential direction and a clearance in the radial direction is provided between the inner and the outer parts of the drive chain wheel and/or even the idler wheel, preferably even between the first and the second radial guiding structures. Meshing teeth serve this purpose. Thereby, shearing forces acting in the circumferential direction are minimized in the damping layers, and a torque can be transmitted past the damping layers. Advantageous as to the manufacture, the teeth of the drive type fastening are an internal crown gear at the inner circumference of the annular flange of the first radial guiding structure, and an outer crown gear at the base of the annular groove of the second radial guiding structure. These crown gears can be directly formed of the material of the parts of the drive or idler wheel, or separately manufactured and then fixed. Suitably, these are cycloidal crown gears manufactured by milling, butting or broaching which bear soiling and environmental influences relatively well.

In one advantageous embodiment, the axial width of the damping layer or of each damping layer is approximately equal to or greater than the axial outer width of the circumferential teeth or the guide collar, and/or the axial width of the crown corresponds to approximately three times the axial outer width of the circumferential teeth or the guide collar, respectively.

In one suitable embodiment, the annular hub is supported in the idler wheel via externally sealed rolling bearings on a pivot defining the axle and secured at least at one side via a clamping nut, preferably with an antitwist protection, such as a calking. This is a solution of a dampened idler wheel advantageous as to its assembly.

Suitably, the inner and outer parts of the idler wheel and/or of the drive chain wheel consist of steel or steel casting.

In a structurally simple embodiment, the first radial guiding structure has an annular flange projecting from the adjacent support surface to the inside with an approximately rectangular cross-section, and the second radial guiding structure comprises an annular groove, also with an approximately rectangular cross-section, which is recessed to the inside with respect to the support surface. A reversed structural shape is also possible, i.e. an annular flange gripping from the inner part to the outside and an annular groove immersed in the outer part. The annular flange is stably radially guided in the annular groove over a large surface and relieves the damping layer from possibly damaging flexing and shearing forces. Here, there can be direct metallic contact, or the guiding surfaces can comprise sliding or protecting coverings.

BRIEF DESCRIPTION OF THE DRAWINGS

With reference to the drawings, embodiments of the subject matter of the invention are illustrated. In the drawings.

DETAILED DESCRIPTION OF THE INVENTION

Figure 1:
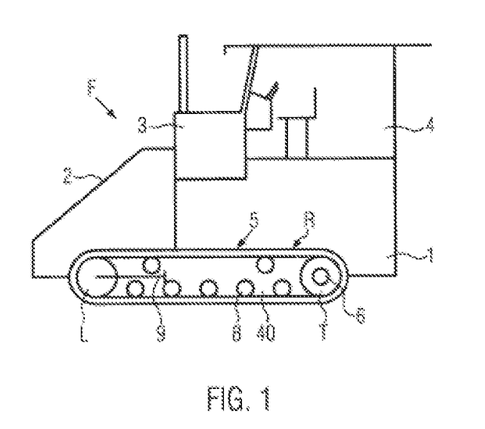
FIG. 1 shows a schematized side view of a road finishing machine or feeder with a tracklaying gear.

A road finishing machine or feeder F schematically shown in FIG. 1 comprises a chassis 1 with a front material bunker 2, an elevated primary power plant 3, for example a diesel engine with a non-depicted pump transfer gear for hydraulically actuated working components, behind it a driver stand 4 and at the bottom side a tracklaying gear 5 on either side. The tracklaying gear 5 contains a drive chain wheel T (tumbler), for example driven by a hydrostat 6, as well as an idler wheel L, which are placed, together with support rollers 8, at a supporting structure 40 and in a caterpillar track R and connected to the chassis 1 via a non-depicted suspension. The idler wheel L is acted upon by a tensioning device 9 to keep the caterpillar track R under the required operating tension (see also FIG. 5).

Figure 5:
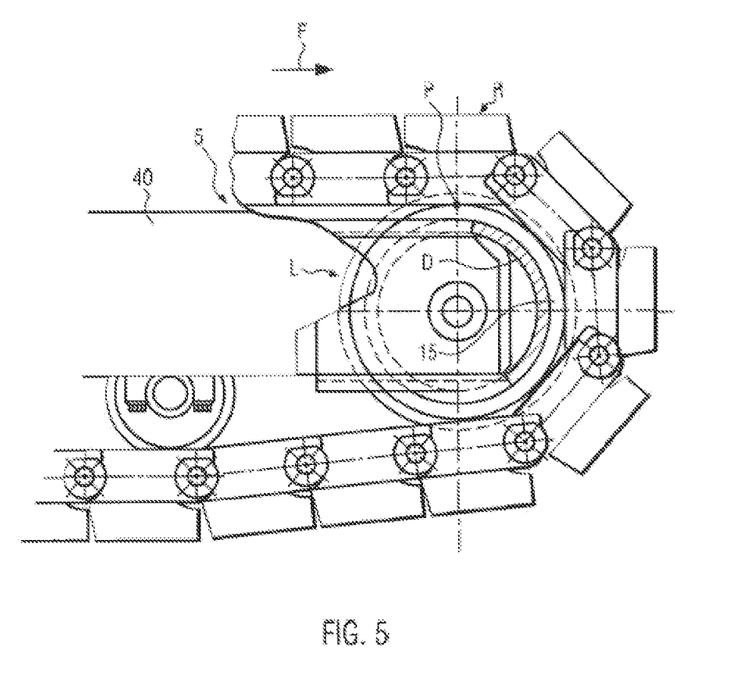
FIG. 5 shows a side view, partially in section, of a partial area of the tracklaying gear.

In the operation of the tracklaying gear 5 e.g. of FIG. 1, according to FIG. 5, a polygon effect occurs in which the caterpillar track R (direction of motion F) cyclically exerts, in the region of a point P, impacts e.g. on a supporting ring 15 of the idler wheel L which impacts result in a loud operating noise when they are metallically transferred to the supporting structure 40.

Figure 2:
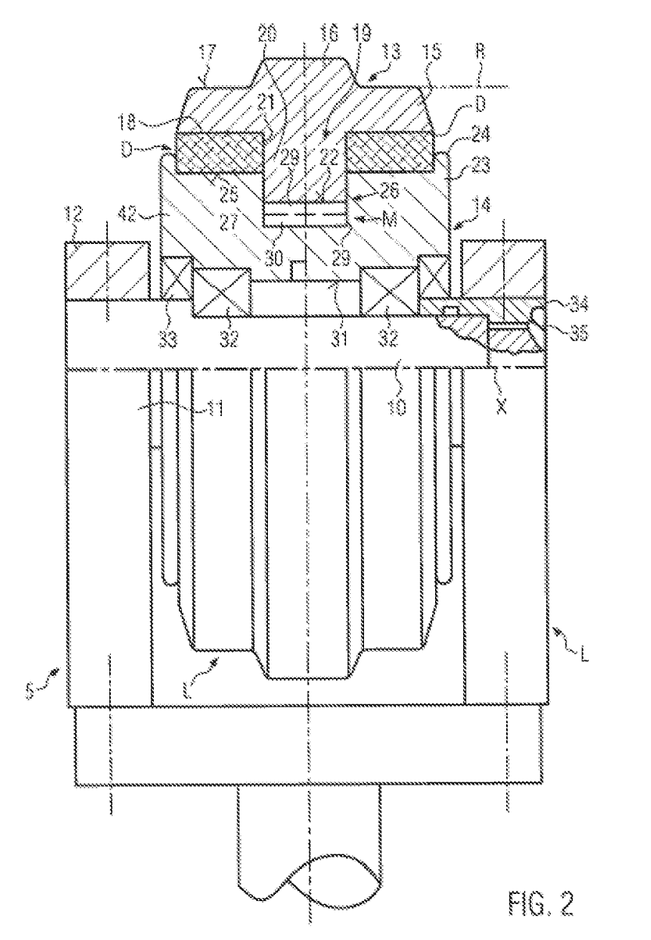
FIG. 2 shows a radial partial section of an embodiment of an idler wheel of the tracklaying gear.

FIG. 2 shows an embodiment of the idler wheel L used, by way of example, in FIG. 1, which comprises an integrated damping for reducing the operating noise, mainly resulting from impacts of the caterpillar track R due to the polygon effect.

It is conceivable to provide the idler wheel L as well as the drive chain wheel T in the tracklaying gear 5 with a damping, or to only provide the idler wheel L or only the drive chain wheel T with a damping.

The idler wheel L shown in FIG. 2 is freely rotatably mounted on a pivot 10 defining an axis X and disposed between cheeks 11 of a structure belonging to the tensioning and side supporting device at which a guiding fork 12 is applied.

The idler wheel L (of steel or steel casting) is divided into an outer part 13 and an inner part 14. Between them, two annular damping layers D of a damping material (an elastomer and/or rubber, reinforced or not reinforced) are incorporated. The outer part 13 is a supporting ring 15 with an approximately T-shaped cross-section, a centric, circumferential raised guide collar 16, and recessed bearing shoulders 17 arranged on either side of the guide collar 16 on which the caterpillar track R rests with chain link parts in this embodiment. At the bottom side of the supporting ring 15, two cylindrical or conical support surfaces 18 are provided which are separated by an axial space and between which there is a first radial guiding structure 19 in the region of the space. The first radial guiding structure 19 is defined, for example, by an inwardly projecting annular flange 20 with an approximately rectangular cross-section and radial side faces 21 as well as an inner circumference 22.

The inner part 14 is an annular hub 23 with an external crown 42 which is wider than the supporting ring 15 and comprises, on either side of a second radial guiding structure 26, cylindrical or conical support surfaces 25 which are limited outside at the edges of the annular hub 23 by projecting annular flanges 24 (or protrusions). The annular flanges 24 externally grip around the damping layers D. Their protrusions are smaller than the radial thickness of the damping layers D. The axial width of each damping layer D approximately corresponds e.g. to the outer width of the guide collar 16. The axial width of the crown 42 approximately corresponds e.g. to three times the outer width of the guide collar 16. The radial thickness of the damping layers D approximately corresponds e.g. to the protrusion of the guide collar 16.

The second radial guiding structure 26 in the shown embodiment consists of an annular groove 27 set back with respect to the support surfaces 25 with an approximately rectangular cross-section and radial inner sides 28 between which the outer walls of the annular flange 20 are guided to be movable exclusively radially. The penetration depth of the annular flange 20 into the annular groove 30 is lower than the radial depth of the annular groove 30. By this, a radial sliding guide with parallel pairs of guiding surfaces is formed.

In the disclosed embodiment, as an option (not absolutely necessary for the idler wheel), a drive type fastening M with a form-fit in the circumferential direction is provided between the outer and the inner parts 13, 14. The drive type fastening M is formed by teeth 29, 30 meshing with a radial clearance, i.e. e.g. an internal crown gear at the inner diameter of the annular flange 20, and an outer crown gear at the base of the circumferential groove 27. Suitably, these are cycloidal crown gears.

In a non-depicted alternative, the drive type fastening M could be formed by transverse pins which intersperse the annular flange 20 starting from the annular hub 23. The transverse pins could be embedded in sleeves with inserted damping material, or engage in bores, e.g. in the annular hub 23 which are lined with a damping material.

For the rotational mounting of the idler wheel L, rolling bearings 32 are mounted on the pivot 10 which are sealed outside by seals 33 and fixed on the pivot 10 by a clamping nut 34. An anti-twist protection 35 can be provided for the clamping nut 34, for example by the clamping nut 34 having a collar-like circlip which is e.g. calked with the pivot 10. Here, a grub screw could also be placed.

Impacts exerted by the caterpillar track R onto the outer part 13 are here directly taken up by the guide collar 16 and the bearing shoulders 17, however such impacts are not transmitted to the annular hub 23 but rather are consumed in the damping layers D via the radial free motion between the first and the second radial guiding structures 19, 26 or via the backlash between the teeth 29, 30.

Figure 3:
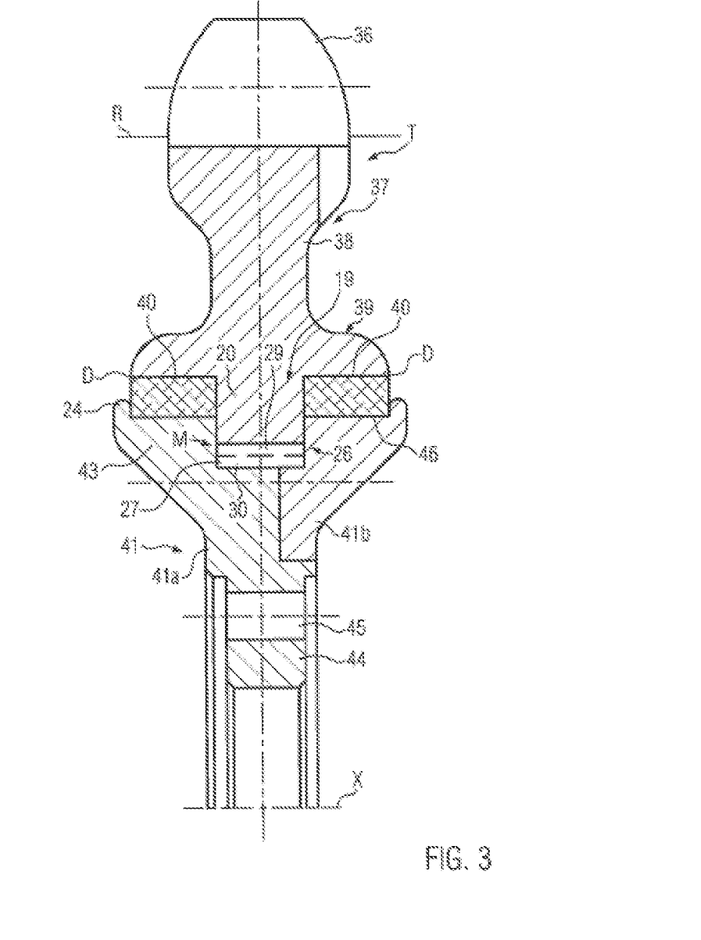
FIG. 3 shows a radial partial section of a drive chain wheel of the tracklaying gear.

FIG. 3 shows an embodiment of a drive chain wheel T which also has an integrated damping.

The drive chain wheel T (tumbler) shown in FIG. 3 is, similar to the idler wheel L in FIG. 2, divided into an outer part 37 and an inner part 41 between which two axially separated damping layers D are provided. The outer part 37 is a ring disk 38 supporting circumferential teeth 36 which engage there in the caterpillar track R between chain links. At the inner surface of the ring disk 38, a widened base part 39 is formed at the bottom side of which support surfaces 40 (cylindrical or conical) are provided between which the first radial guiding structure 19 is located (analogous to FIG. 2). The inner part 41 (for assembly reasons optionally consisting of two parts 41a, 41b) has a crown 43 which is broader than the base part 39 and encloses it with the annular flanges 24. In the inner part 41, the second radial guiding structure 26 is provided analogously to FIG. 2 between cylindrical or conical support surfaces 46 for the damping layers D arranged with a space between them. The inner part 41 is continued in a disk body 44 in which bores 45 for transmitting the driving torque are formed.

Between the inner and the outer parts 37, 41, in FIG. 3, too, a drive type fastening M with a form-fit in the circumferential direction is provided in the form of the meshing teeth 29, 30 which have a radial backlash so that the damping layers D can dampen transmitted impacts with exclusively radial relative motions between the inner and the outer parts 37, 41.

Figure 4:
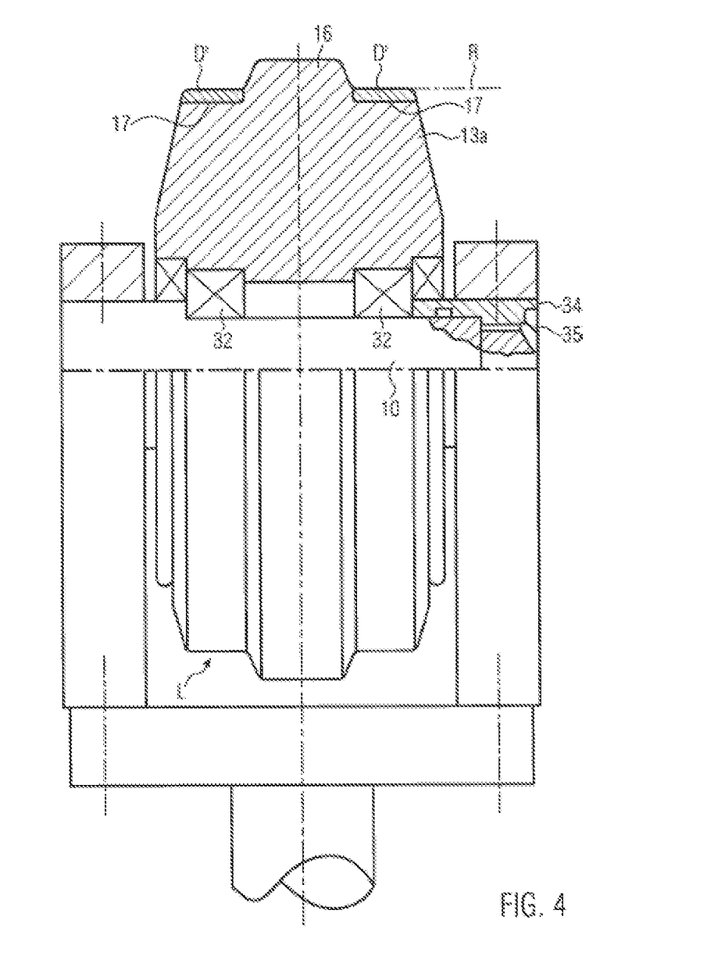
FIG. 4 shows a radial partial section of another embodiment of an idler wheel of the tracklaying gear.

The simplified embodiment of the idler wheel L shown in FIG. 4 comprises the damping layers D' embodied like linings on the bearing shoulders 17 on either side of the guide collar 16, so that the guide collar 16 takes on and transmits a major portion of the loads, and the damping layers D only a portion of the total load and impacts of the caterpillar track R. The damping layers D are here relatively thin (about 50% to about 80% thinner), compared to FIGS. 2 and 3, and they each have an axial width similar to the corresponding outer width of the guide collar 16. The outer part 13a of the idler wheel L is, analogously to FIG. 2, freely rotatably mounted on the pivot 10 defining the axis X via rolling bearings 32 and secured by the clamping nut 34 and the anti-twist protection 35.

The guide collar 16 transmits lateral guiding forces to the pivot 10 and thus relieves the damping layers D'. The damping layers D' are firmly seated on the support surfaces formed by the bearing shoulders 17, e.g. by shrink-fitting or drawing on, or by gluing, vulcanizing, spraying, coating or the like.

Figure 6:
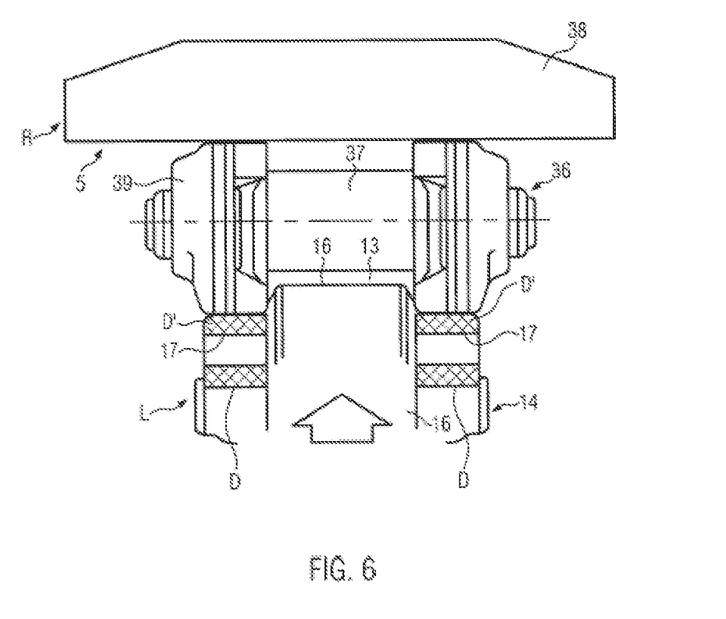
FIG. 6 shows a detail variant to FIG. 2 partially in section.

In a view similar to that of FIG. 2, FIG. 6 shows a detail variant of an idler wheel L which is basically designed as in FIG. 2. One difference between the embodiment of FIG. 2 and the one shown in FIG. 6 is that in the FIG. 6 embodiment two axially separated damping layers D' of the same diameter are additionally attached on the bearing shoulders 17 of the outer part 13 which enclose the guide collar 16 between them. These damping layers are, for example, approximately as strong and wide as the internal damping layers D between the outer and the inner parts 13, 14 of the idler wheel L.

Although this principle is well suited for an idler wheel, such additional damping layers D' can also be provided in a drive chain wheel (for example of FIG. 3). The damping layers D, D' can consist, for example, of a polyurethane rubber with a Shore A hardness between about 80 and 92, and they can be reinforced or not reinforced. The additional damping layers D' can be shrink-fitted with oversize or applied by coating.

In FIG. 6, a cushion 38 of the caterpillar track R is shown which is connected with a track pin 37 of a track joint 36 and/or link plates 39. At least the link plates 39 contact the additional damping layers D' while the guide collar 16 at least in some cases generates lateral guiding forces for the caterpillar track R which are taken up via the radial sliding guide not shown in FIG. 6 and the rotational mounting of the idler wheel in the supporting structure 40 (FIG. 1).

The invention claimed is:

1. Tracklaying gear for a road finishing machine or a feeder and having (a) a drive chain wheel comprising circumferential teeth and being rotatably driven about an axis, and (b) at least one idler wheel freely rotating about an axis inside a caterpillar track and including, a lowered circumferential bearing shoulder located on at least at one side of a centric raised guide collar, and at least one damping layer comprising a damping material is integrated in the drive chain wheel or the idler wheel between the axis and the caterpillar track by the drive chain wheel or the idler wheel being coaxially divided between the axis and the caterpillar track into an inner and an outer part and at least two axially separated damping layers being arranged between the inner and the outer parts and the inner and the outer parts are guided to exclusively radially slide within each other and the inner and outer parts being are exclusively radially movable relatively with respect to each other, and wherein the outer part of the drive chain wheel comprises the circumferential teeth and is a metallic ring disk consisting of one piece and having an internal circumferential base part with a first radial guiding structure, the inner part comprises a circumferential crown matching the base part with a second radial guiding structure matching the first radial guiding structure, that at the base part and the crown, at least at an axial side of the radial guiding structure, cylindrical or conical support surfaces facing each other are provided, the damping layers being arranged between the support surfaces and connected with one support surface each, and the first and the second radial guiding structures form a sliding guide meshing exclusively with a radial free motion and wherein meshing teeth located between the inner and outer parts are provided as a drive type fastening with a clearance in the radial direction and a form-fit in the circumferential direction, and the teeth comprise an internal crown gear at the annular flange and an external crown gear at the base of the annular groove.

2. Tracklaying gear according to claim 1 wherein, two external annular damping layers separated in the axial direction by a space and having approximately the same diameters are additionally provided at the outer part at the drive chain wheel and/or the idler wheel, and in the region of the space, the metallic external teeth or the guide collar, respectively, coming into direct contact with the caterpillar track are arranged, the teeth or guide collar projecting beyond the external damping layers to the outside, and that the respective external damping layer is attached on the bearing shoulder and firmly connected to the bearing shoulder by drawing it on, oversize shrink-fitting, spraying, gluing, coating or vulcanizing.

3. Tracklaying gear according to claim 2, wherein the outer part of the idler wheel comprising the guide collar and bearing shoulders on either side is a supporting ring with an internal first radial guiding structure and cylindrical or conical support surfaces on either side of the first radial guiding structure, the inner part of the idler wheel rotatably mounted on the axis is an annular hub with a second radial guiding structure matching the first radial guiding structure and cylindrical or conical support surfaces (25) on either side of the second radial guiding structure in a circumferential crown matching the supporting ring, one damping layer each is disposed between the support surfaces, and firmly connected with a support surface, and the first and second radial guiding structures form a sliding guide meshing exclusively with a radial free motion.

4. Tracklaying gear according to claims 1 wherein the crown is axially wider than the base part or the supporting ring, respectively, and comprises annular flanges radially projecting to the outside at the edges whose protrusion is smaller than the radial thickness of the damping layer.

5. Tracklaying gear according to claim 1 wherein the axial width of the damping layer is identical to or greater than the axial outer width of the circumferential teeth or the guide collar, and/or that the axial width of the crown is three times the axial outer width of the circumferential teeth or the guide collar, respectively.

6. Tracklaying gear according to claim 1 wherein the first radial guiding structure in the outer part is an annular flange projecting from the support surface to the inside and having an approximately rectangular cross-section, and that the second radial guiding structure in the inner part is an annular groove with an approximately rectangular cross-section recessed inwards with respect to the support surface.

7. Tracklaying gear according to claim 1 wherein the meshing gears are located between the first and second radial structures.

8. Tracklaying gear according to claim 1 wherein at least one of the internal crown gear and the external crown gear comprises a cycloidal crown gear.

9. Tracklaying gear according to claim 1 wherein the metallic ring disk is assembled from segments.

10. Tracklaying gear for a road finishing machine or a feeder and having (a) a drive chain wheel comprising circumferential teeth and being rotatably driven about an axis, and (b) at least one idler wheel freely rotating about an axis inside a caterpillar track and including, a lowered circumferential bearing shoulder located on at least at one side of a centric raised guide collar, and at least one damping layer comprising a damping material is integrated-in the drive chain wheel or the idler wheel between the axis and the caterpillar track by the drive chain wheel or the idler wheel being coaxially divided between the axis and the caterpillar track into an inner and an outer part and at least two axially separated damping layers being arranged between the inner and the outer parts and the inner and the outer parts are guided to exclusively radially slide within each other and the inner and outer parts being are exclusively radially movable relatively with respect to each other and wherein, two external annular damping layers separated in the axial direction by a space and having approximately the same diameters are additionally provided at the outer part at the drive chain wheel and/or the idler wheel, and in the region of the space, the metallic external teeth or the guide collar, respectively, coming into direct contact with the caterpillar track are arranged, the teeth or guide collar projecting beyond the external damping layers to the outside, and that the respective external damping layer is attached on the bearing shoulder and firmly connected to the bearing shoulder by drawing it on, oversize shrink-fitting, spraying, gluing, coating or vulcanizing ,and the outer part of the idler wheel comprising the guide collar and bearing shoulders on either side is a supporting ring with an internal first radial guiding structure and cylindrical or conical support surfaces on either side of the first radial guiding structure, the inner part of the idler wheel rotatably mounted on the axis is an annular hub with a second radial guiding structure matching the first radial guiding structure and cylindrical or conical support surfaces on either side of the second radial guiding structure in a circumferential crown matching the supporting ring, one damping layer each is disposed between the support surfaces, and firmly connected with a support surface, and the first and second radial guiding structures form a sliding guide meshing exclusively with a radial free motion.

11. Tracklaying gear according to claim 10, wherein the annular hub of the idler wheel is supported by externally sealed rolling bearings) on a pivot defining the axis and is secured at least at one side by a clamping nut).

* * * * *